(12) United States Patent  (10) Patent No.: US 8,559,921 B2
Thommana et al.  (45) Date of Patent: Oct. 15, 2013

(54) MANAGEMENT OF SECURITY FEATURES IN A COMMUNICATION NETWORK

(75) Inventors: John V. Thommana, Austin, TX (US); Lizy Paul, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1657 days.

(21) Appl. No.: 11/205,419

(22) Filed: Aug. 17, 2005

(65) Prior Publication Data

US 2007/0042769 A1  Feb. 22, 2007

(51) Int. Cl.
*H04M 1/66*  (2006.01)
*H04W 4/00*  (2009.01)
*H04K 1/00*  (2006.01)
*H04L 29/06*  (2006.01)

(52) U.S. Cl.
USPC ........... 455/410; 455/411; 370/328; 380/270; 713/153

(58) Field of Classification Search
USPC .................. 455/411, 410; 370/328; 380/270; 713/153; 709/227, 229
See application file for complete search history.

(56) References Cited

U.S. PATENT DOCUMENTS

| 6,081,601 | A * | 6/2000 | Raivisto ........................ 380/270 |
| 6,418,130 | B1 * | 7/2002 | Cheng et al. ................... 370/331 |
| 6,651,105 | B1 * | 11/2003 | Bhagwat et al. ............... 709/239 |
| 7,167,705 | B2 * | 1/2007 | Maes .......................... 455/432.1 |
| 2003/0100291 | A1 * | 5/2003 | Krishnarajah et al. ........ 455/410 |
| 2004/0147251 | A1 * | 7/2004 | Nakayama et al. ......... 455/414.2 |
| 2004/0176071 | A1 * | 9/2004 | Gehrmann et al. ............ 455/411 |
| 2005/0282523 | A1 * | 12/2005 | Yoshihara et al. ............. 455/411 |
| 2006/0003765 | A1 * | 1/2006 | Patil et al. ................... 455/432.1 |
| 2006/0026688 | A1 * | 2/2006 | Shah .............................. 726/25 |
| 2006/0046693 | A1 * | 3/2006 | Tran et al. ...................... 455/411 |
| 2006/0087999 | A1 * | 4/2006 | Gustave et al. ................ 370/328 |
| 2006/0094400 | A1 * | 5/2006 | Beachem et al. .............. 455/410 |
| 2006/0182083 | A1 * | 8/2006 | Nakata et al. ................. 370/352 |
| 2006/0193283 | A1 * | 8/2006 | Harris et al. ................... 370/328 |
| 2006/0209789 | A1 * | 9/2006 | Gupta et al. ................... 370/352 |
| 2006/0236384 | A1 * | 10/2006 | Lindholm et al. ............... 726/10 |
| 2006/0248337 | A1 * | 11/2006 | Koodli .......................... 713/171 |
| 2006/0253701 | A1 * | 11/2006 | Kim et al. ..................... 713/153 |
| 2006/0270448 | A1 * | 11/2006 | Huotari et al. .............. 455/552.1 |
| 2006/0274696 | A1 * | 12/2006 | Krishnamurthi .............. 370/331 |
| 2006/0291455 | A1 * | 12/2006 | Katz et al. ..................... 370/355 |

OTHER PUBLICATIONS

Josang, Audun et al., "Security in Mobile Communications: Challenges and Opportunities," Distributed Systems Technology Center, Brisbane Australia, 2003.

* cited by examiner

*Primary Examiner* — Christopher M Brandt

(57) ABSTRACT

A method of operation for managing network security features is disclosed. A communication device such as a mobile telephone or a modem can establish a position as a communications intermediary supporting communications between a first communication device such as a personal computer and a third communication device such as a server. The intermediary can detect a security feature between these "end devices", and disable security features on intermediate segments of the end-to-end communication link. The end-to-end communication may utilize a virtual private network as a security feature and other security features on the intermediate segments can be disabled when they provide negligible additional security for the communications.

21 Claims, 7 Drawing Sheets

MANAGEMENT OF SECURITY FEATURES IN A COMMUNICATION NETWORK

FIELD OF THE DISCLOSURE

The present disclosure relates generally to network based communications and more specifically to management of security features in a communication network.

BACKGROUND

Growth in the communication industry continues at a robust pace. New communication systems continue to develop and these systems often "seamlessly" integrate with existing systems. For example, wireless local area networks (WLANs) have evolved to facilitate connections between portable devices and the Internet. Each newly developed system typically employs a new and different security protocol. For example, devices in a wireless local area networks (WLAN) may utilize Wired Equivalent Privacy (WEP) or 802.1x based security, hardwired LAN based devices may utilize a Microsoft Windows® security feature and a cellular telephone system may utilize a ciphering security feature. Thus, when these communication subsystems interact, each subsystem or segment of a communication link typically employs a different security feature or routine. Often, security features of one link are applied to secure data of another link resulting in a "piggy backing" of security features resulting in multiple or redundant security features. It is inefficient to run multiple or redundant security features particularly when a security feature that provides minimal security is overlaid on a robust security feature. Accordingly, it would be advantageous to efficiently manage communication security functions and features in a communication system to overcome these problems.

BRIEF DESCRIPTION OF THE DRAWINGS

The present disclosure may be better understood, and its numerous features and advantages made apparent to those skilled in the art by referencing the accompanying drawing, in which like reference numbers indicate similar or identical items.

DETAILED DESCRIPTION

A method of operation for managing network security features is disclosed. A communication device such as a radiotelephone or a modem can establish a position as a communications intermediary supporting communications between a first communication device such as a personal computer and a third communication device such as a server. The communications intermediary can detect a security feature between these "end devices," and disable security features on intermediate segments of the end-to-end communication link. In the illustrative embodiment an intermediary can be considered as any device that helps to facilitate communication between two devices. The security on individual links of a multi-link connection can be lowered or totally disabled if there exists a piggybacked security feature at the individual link, such as an end-to-end security feature, whose capabilities are equal to greater than the security supported on the individual links.

In one configuration the radiotelephone can be the communications intermediary and can eliminate redundant security processes on the link between the radiotelephone and a portable computer and the link between the radiotelephone and a base station (i.e. the intermediary links). In another configuration, a user can select a specific security link to be disabled and the conditions for disabling the link. In another configuration, a user may desire not to deactivate security on a particular link. Further, a user may select a level of security for communications, such as a high, medium or low level of security. Thus, based on the user selection, the system and method described herein can maintain a user-selected level of security. Deactivating redundant or ineffective security features can reduce the processing bandwidth needed to support a communications link thereby, increasing battery life for a mobile device, increasing the speed of communications and reducing power consumption.

Figure 1:
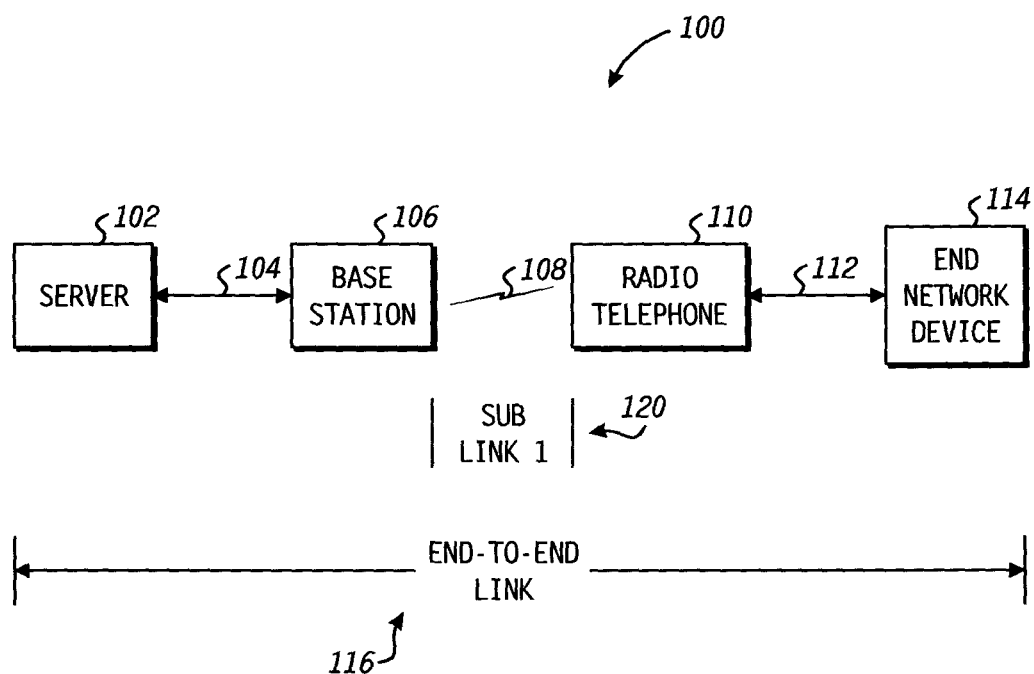
FIG. 1 is a block diagram that illustrates a communication system having a plurality of different segments.

Referring to FIG. 1 a simplified block diagram of a communications system is illustrated. An end network device 114 such as a computer or a personal digital assistant (PDA) can facilitate a connection with a radiotelephone 110 over first communication link 112. The communication link 112 can be in the form of a wireless local area network (WLAN) or a local area network (LAN) or a hardwired connection such as a Universal Serial Bus connection. Radiotelephone 110 can commence a link 108 with base station 106. Radiotelephone 110 may be a cellular telephone, a ground-based radio (a telephony/cable/DSL/optical modem), or a satellite based radio.

The base station 106 may be located at a cellular tower site and receive a variety of communication protocols using analog and digital signals having a variety of different frequencies. Base station 106 can be connected to a server 102 over a link 104. Link 104 can be a public communication network such as a local telephone network or a global communication network such as the Internet. If the radiotelephone 110 is a cellular telephone, a cable type Internet Protocol phone, a DSL based phone or a modem compatible phone then the base station may be a switch or router capable of communicating with a server 102.

An end-to-end link 116 has been established between devices 102 and 114 having intermediary links 104, 108 and 112. Any number of devices could be set up in the link, as FIG. 1 is exemplary. When establishing an end-to-end connection each link, such as the link between end network device 114 and radiotelephone 110, can implement a "link specific security feature." For example, a uniform serial bus (USB) security feature may be provided from end network device 114 to radiotelephone 110. Likewise, a ciphering security feature may be implemented between radiotelephone 110 and base station 106. An end-to-end security feature can also be established such as a virtual private network (VPN) between end devices 114 and 102 as part of end-to-end link 116.

When an end-to-end security feature is operational, such as a VPN, link specific security features or security features on intermediate links such as link 108 can be redundant in that they provide the same or less security than the VPN. Link 108 (link between radio telephone 110 and base station 110) is a portion or sub link of link 116. Thus, in accordance with the present disclosure, a device or intermediary device such as radiotelephone 110 can determine a piggy-backed security feature such as the end-to-end security feature exists and disable one or more "redundant" security features on sub links to manage network communication security. The determination may be made by monitoring communications or by receiving a control signal from a component in the network.

Figure 2:
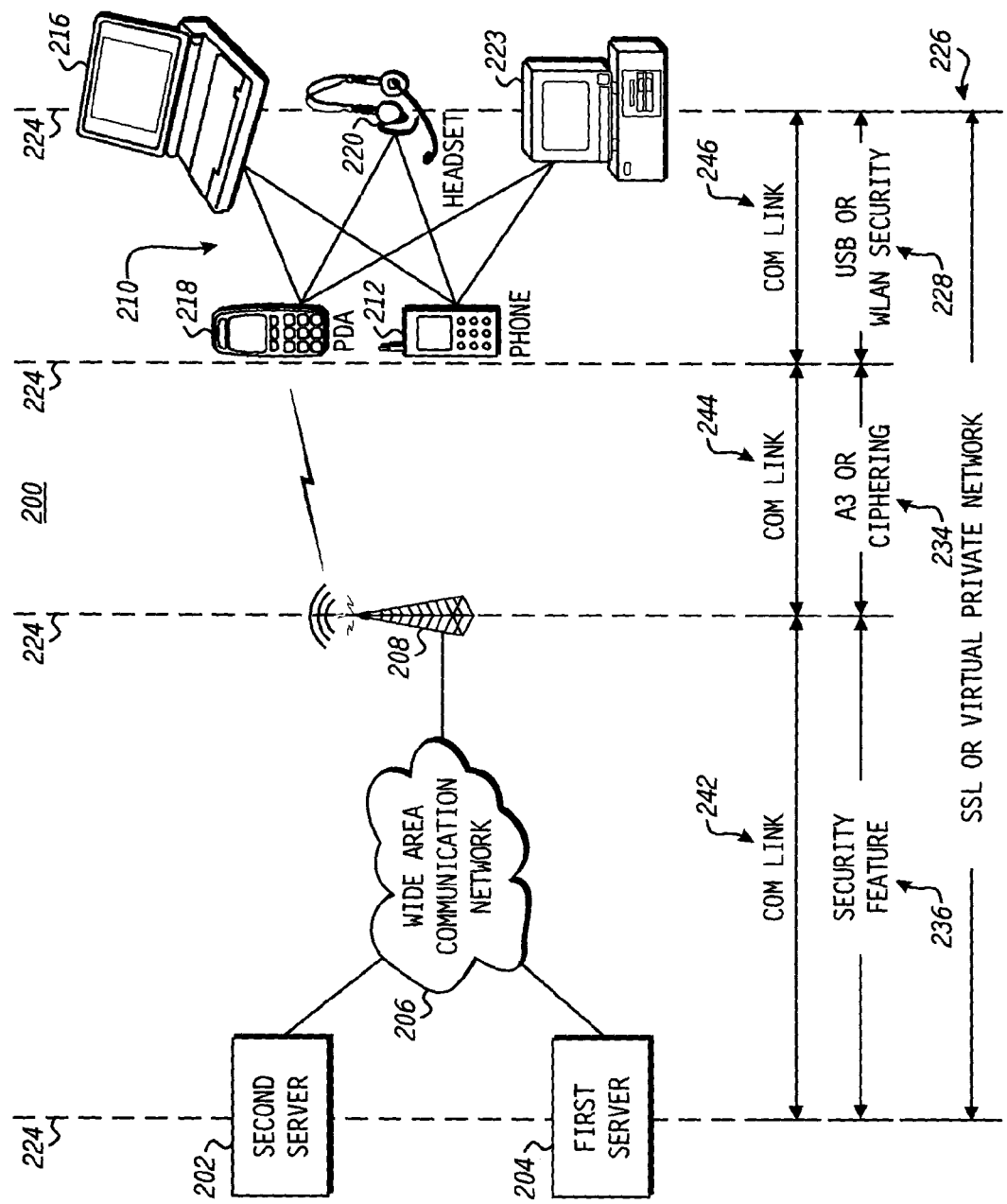
FIG. 2 is a block diagram that depicts an exemplary communication system in accordance with the present disclosure.

Referring to FIG. 2 an exemplary communications system 200 is illustrated. Partition lines 224 have been provided through the exemplary communication system 200 to facilitate discussion of operational segments of the communication system 200. Generally, each horizontal partition line 224 defines a beginning and/or an end of a communication segment or link. The partition lines 224 are illustrated to define a first link 242, a second link 244, and a third link 246 (links 242-246). Each link 242-246 is a communications link between two devices, which together function as an independent communication system having is own security features capable of providing secure communication from one end of the link to the other.

First link 242 illustrates an operative communication between at least one of first and second servers 202 and 204, and a base station 208. Second link 244 shows an operative communication between base station 208 and radiotelephone 212 or between base station 208 and personal digital assistant 218. Third link 246 depicts an operative communication between a mobile device such as radiotelephone 212, or PDA 218 to a head set 220, a portable computer 216 or other end devices such as a desktop computer 223. End devices 216, 220, 223 (216-223) will typically communicate wirelessly over a wireless local area network (WLAN) 210, though a hardwired network or individual wires may be utilized for such communications.

In one embodiment, during operation, different protocols and security features are utilized over communication links 242-246. For example, the third link 246 can be a hard-wired link that utilizes a USB based security protocol or a WLAN based security feature as illustrated by security link 228. The second communication link 244 between radiotelephone 212 and base station 208 may utilize an A3 logarithm for security over a global system for mobile (GSM) communication structure or other ciphering security feature. Radiotelephone 212 can implement one or more of many different mobile communications protocols such as GSM, TDMA, CDMA, Analog, etc. each, which may utilize one or more security feature.

Communications between base station 208 and servers 202 and 204 may also utilize a digital encryption security feature. TCP/IP is currently a widely accepted protocol for providing security in server-base station communications. Alternately, a virtual private network (VPN) tunnel can be utilized to route multiple subscriber traffic between a base station and a server.

After the end-to-end connection is set up and each link specific security feature is established, the mobile computer 216 may request, and establish an end-to-end security feature such as a virtual private network (VPN) or a secure socket layer (SSL) with one of the servers 202 and 204. This VPN is graphically illustrated by SSL/VPN link 226. A VPN is often referred to as a VPN tunnel because the data flowing through the "tunnel" is not "visible" to others who may be monitoring network traffic. A VPN tunnel may be established using many different architectures such as an (IPSec) compliant system, as presented in the Security Architecture for the Internet Protocol, dated November 1998. The VPN link 226 can provide a robust security feature for end-to-end communications between the portable computer 216 and the server 202.

In accordance with the embodiment disclosed, after the VPN 226 is established it can be advantageous to disable certain link specific security features (i.e. 236, 234, and 228). Often, the link specific security features 236, 234, and 228 over various sub-links provide substantially less protection than the security provided by the VPN 226. Typically, the operation of each link specific security feature is added on top of, or piggy backed on the operational VPN security feature 226. This redundancy unnecessarily consumes valuable resources when security is provided that is not needed.

The control and management of security features on individual communication links or segments can effectively be performed by devices in the communication link based on their access to the communication stream. In one configuration, normal security features are established on the communication links 242-246 during an initiation/"handshake" process. For example, when portable computer 216 handshakes with radiotelephone 212 to using WLAN (802.11a/b/g/n) based devices. A WEP or other 802.1x based security link may be automatically set up, if an access point (a connection node) is configured to use authentication and encryption. In this embodiment radiotelephone 112 may have a communication security module that detects a redundant sub-link security feature, (i.e. detects the VPN 226 and the WLAN 228 WEP or 802.1x), and disables the link-specific security feature 228. Generally, removal of this security management function will not substantially affect the security level of the end-to-end communications but can significantly reduce the processing requirements of the radiotelephone 212. The existence of the end-to-end security feature 228 can be detected by the intermediary device, i.e., radiotelephone 112, by receiving security feature may be to a control signal from a network device or responsive to internal device control signals that monitor the communications.

A user of the communication system 200 may select security levels for the system or override the "auto-security management" process described herein. For example, radiotelephone 212 (A GSM cell phone) may detect an existence or operation of the VPN 226 and determine that the A3 (authentication scheme used in GSM or ciphering (A5, A8) security between the radiotelephone 212 and the base station 208 is redundant. Then, if a user has not disabled the management feature, the mobile telephone 212 can disable the ciphering security feature to realize a significant power savings and an increase in data processing efficiency. However, if the user has disabled security management on this link, the ciphering feature will remain operational. In actual operation, the enabling and disabling of security features can be accomplished utilizing additional control signals possibly in the handshake protocols and operational protocols between devices. For example, a "REDUNDANT SECURITY ON" and a "REDUNDANT SECURITY OFF" control signal may be sent in a control type packet over the network.

A user interface for selecting user overrides can be provided to the user in the form of a graphical user interface having similar graphics to those illustrated in FIG. 2 (with the addition of selectable buttons). Using the illustrated security links 236 234, and 228 the user can select security links to identify links not to be altered by the security management features described herein.

In another configuration, after user set up the system can dynamically manage which, if any, security features to turn on and off. The dynamic management can be achieved responsive to detection of the sporadic operation of more advanced multi-link security features such as a VPN being established and timing out, then being reestablished.

Figure 3:
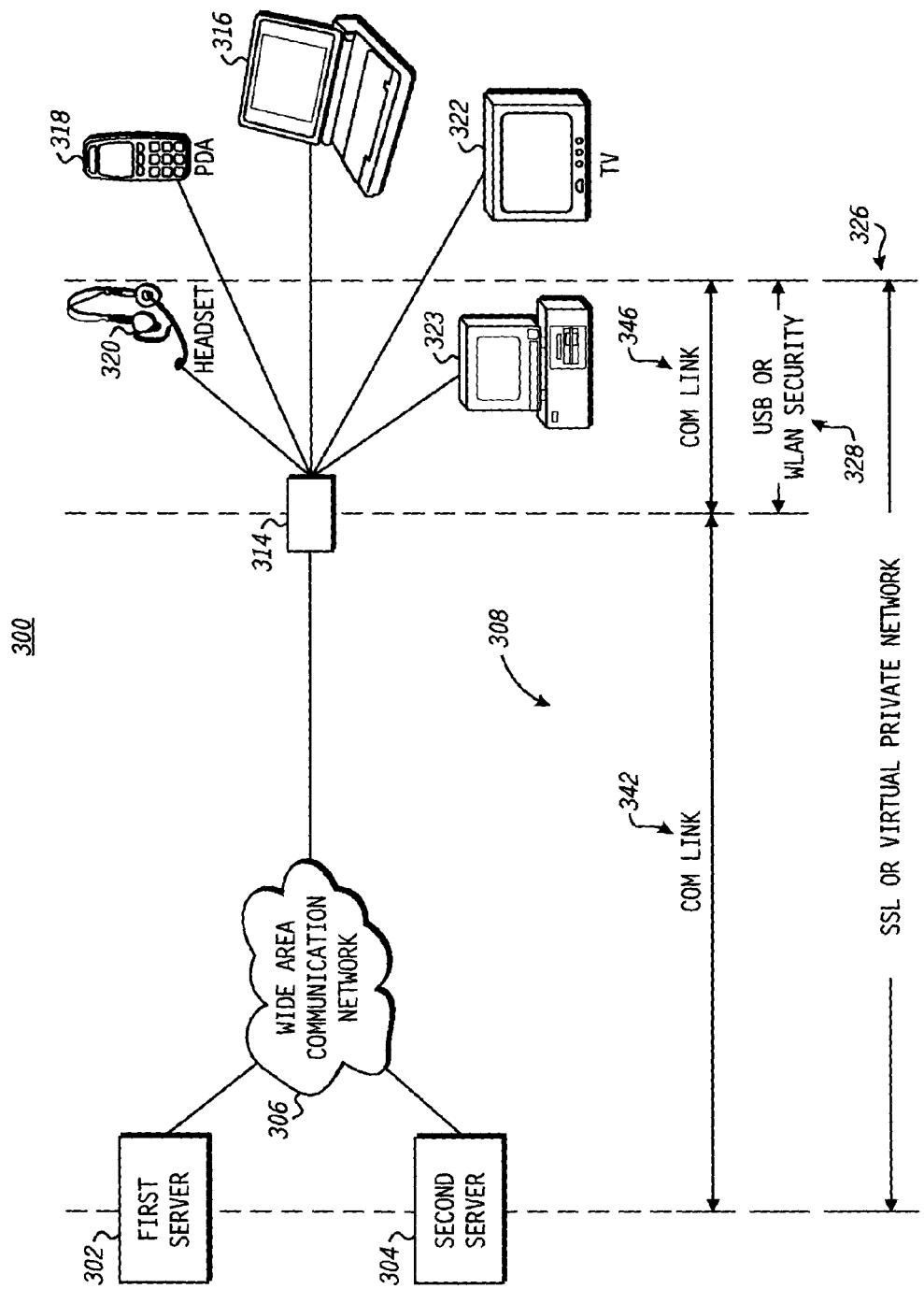
FIG. 3 is a block diagram that shows another exemplary communication system in accordance with the present disclosure.

Referring to FIG. 3 another configuration of a communication system 300 is depicted. First server 302 and second server 304 are connected to a WAN 306, such as the Internet, which is connected to hub 314. The hub 314 can be a gateway, a residential gateway, a router, a modem, a set top box, a wireless hub, or any device that can facilitate communications. In the exemplary illustration hub 314 can communicate either by wired or wireless connection with headset 320, personal digital assistant 318, portable computer 316, television 322 and desktop computer 323 (end devices 316-323).

Communication link 342 illustrates an operative communication between one of first and second server 302 and 304 and hub 314 via WAN 306. Likewise, communication link 346 illustrates an operative communication link between hub 314 and end devices 316-323. Communication sub-link security features such as USB or WLAN security features 328 can be implemented over communication sub-links of an end-to-end link 326. As described above, communication sub-link security features of an end-to-end link can be disabled based on the presence of a more comprehensive and/or robust security feature. In one embodiment, a user may manually request a network device to disable a security sub-link feature to increase the available processing bandwidth and extend battery life of a device.

In another configuration, a security manager resident on an intermediary device such as PDA 318 or headset 320 can determine (i.e. by self detection or responsive to a control signal) the set up or operation of an end-to-end security feature, or the "teardown" of an end-to-end security feature, and based on this determination, the security manager can activate, deactivate, or reactivate a security feature on a communication sub-link of the end-to-end communication link.

It will be appreciated that an intermediary device can be considered any device that helps to facilitate communication between two locations. Thus, end devices such as PDA 218 or wireless headset 220 of FIG. 3 are intermediary devices as well as devices 302, 304 and 314 that manage WLAN security features or VoIP security features. Similarly, a passive listening device that is not an end device or a "pass through facilitator" may be considered an intermediary and facilitate management of network security.

In the illustrated embodiment, hub (a WLAN Access Point) 314 may perform in compliance with IEEE 802.11i security standard. Alternately, the hub may perform as a modem, as a voice over Internet protocol (VoIP) receiver, a hardwired LAN receiver, and a Bluetooth® compatible receiver for devices such as headset 320 and PDA 318. In these configurations the mobile phone 312 and the LAN interface 314 may act as a security manager for the end devices. Thus, devices that can detect or determine security features, can act as security managers or communication intermediaries.

In one example, entertainment content may be sent from first server 302 to a residence over links 342 and 346. The content provider may utilize a digital rights management (DRM) security feature to distribute entertainment content to end devices 316-323. In such a configuration the hub 314 or the end devices 316-323 could manage such a security feature. The few types of security features mentioned herein should not be considered limiting, as many security features such as Microsoft's® PPTP virtual private network could be utilized for intermediate or end-to-end security. As discussed above, disparate non-contributory security protocols and features are often operational during network communications consuming significant resources. Disabling such ineffective security features can provide substantial benefits.

Figure 4:
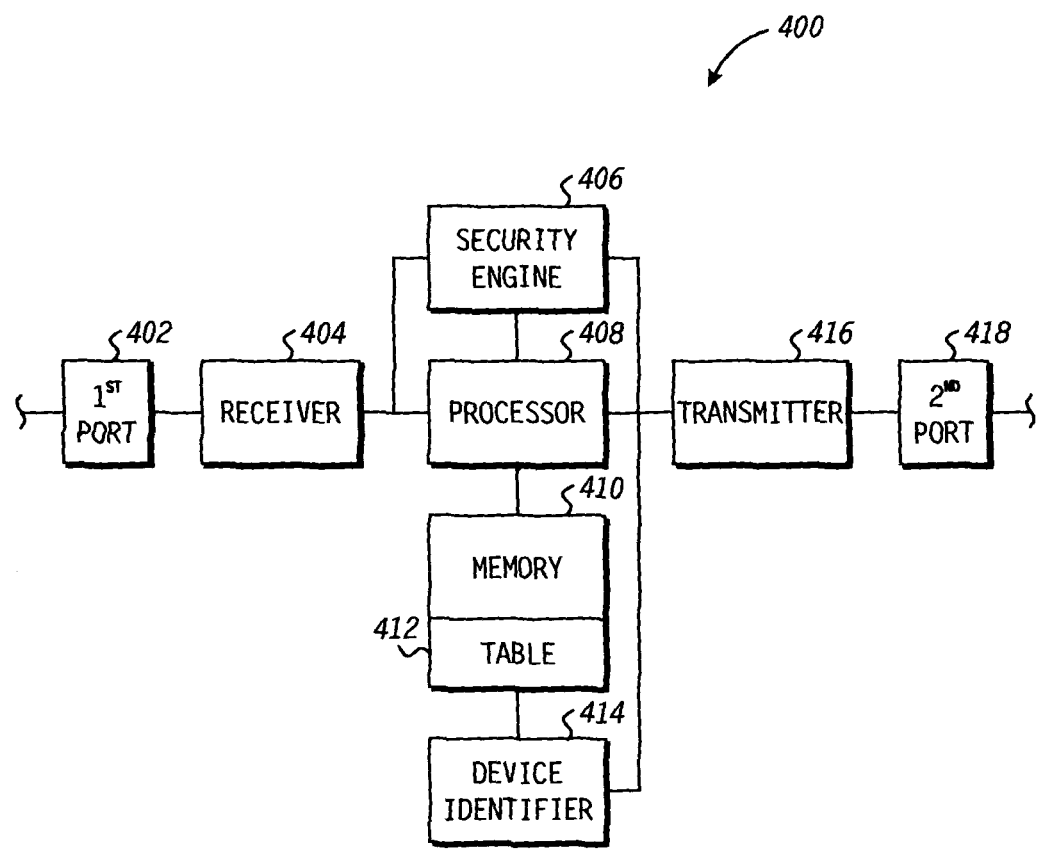
FIG. 4 is an exemplary block diagram of a system configured to manage network security.

Referring to FIG. 4 an exemplary intermediary communication module (ICM) 400 that can support a security feature and can disable a security feature is illustrated. The ICM 400 may be stand-alone device or integrated into/with network devices such as the mobile telephone or gateway of FIGS. 2 and 3. The ICM 400 can have a first port 402 connected to a receiver 404. The receiver can be configured to receive a communication directly or indirectly from an end device. Alternately, the ICM 400 can be integrated into an end device. The receiver 404 typically receives a communication from a source and forwards the communications to a security engine 406 and the processor 408.

The processor 408 is connected to memory 410, a security look-up table 412, a device identifier table 414, and a transmitter 416. The security look-up table 412 can provide security configurations and the device identifier table 414 can store device network addresses, device types and security features associated with a network device. Transmitter 416 is connected to a second port 418 for transmitting data over a communications network. Although the transmitter 416 and receiver 404 are illustrated as separate devices a "transceiver" could be utilized to perform both transmit and receive functions.

In operation, a communication signal, such as a request to send information and the information to be sent, is received at first port 402 and buffered by receiver 404. The processor 408 can select a security feature for implementation and utilize security engine 406 to provide such security in communications sent out to the network by transmitter 416. The security engine 406 could perform encryption ciphering, scrambling, or any procedure providing security or privacy. This security feature may be a device-to-device security feature that provides limited privacy or a more robust security feature such as that provided by a VPN, a secure socket layer protocol, or other protocol.

During an initial communication set up, devices typically perform an initiation routine. After communication has commenced, the processor 408 may identify the device transmitting and place a device identifier in the device identifier table 414.

A communications standard, such as the 802.1X standard discussed above, can include control messages to facilitate remote entry and exit of secure control modes, i.e. "EnterSecureMode" and "LeaveSecureMode" commands, as well as to handle passwords for securing the control commands. Once a communication device is authenticated, and an identity and possibly a password are stored in the identifier table 414, the communication device can receive requests to leave a secure mode and transmit unsecured data knowing that its transmissions will be secured. For example, a transmitting device such as a cellular telephone can request a user to enter a security code to authenticate a security process and allow the cellular telephone to receive or send control messages that enable or disable security features.

In accordance with the 802.1X standard certain bits in the protocol are reserved and could be utilized for such a process. Reserved bits exist in the capability exchange fields that can be utilized during association/authentication or data exchange. These reserve bits can be utilized to indicate that a user may send messages without a security feature.

The control message can be sent utilizing the reserved bits in the packet header to indicate to a device (a peer) that the user/device is entering/leaving a secure mode. The reserved bits can also be utilized when a communication is transmitted from the network to the intermediary device to control entering or leaving a secure mode and exchanging control or data transmissions.

The processor 408 may view and process communications for the identified device and determine what security features are implemented by the communication devices. During the communications or communications set up, identities of devices that are active or connected to the network and are utilizing security features can be determined and stored in table 412. Additionally, specifics about security features associated with these devices can also be stored in table 412. Thus, an intermediary device or a security manager can utilize the table to track security features that are operable, disabled, and/or available.

If no end-to-end security feature or security feature spanning more than one link is present on the information received at the ICM 400, the processor 408 may not take any action regarding normal security feature management (i.e. disable any security features). However, if is determined that there is an adequate (possibly an end-to-end) security feature associated with the received data, the processor 408 can de-activate implementation of security features by the security engine 406 and pass data without compounding additional security features on existing security features. The security engine 406 is provided to illustrate and emphasize a specialized processing procedure that could be implemented on nearly any processing platform. In one embodiment the functions of the security engine 406 and the processor 408 are performed by a data processing system that resides on a radiotelephone.

Likewise, when data over the communication link indicates that the security feature will be removed. For example, a VPN is "timing out," the security engine 406 can reactivate a security feature on a particular communication link or segment. In one configuration, a user input stored in memory 410, may override the processor's attempt to disable the communication sub-link security feature.

Figure 5:
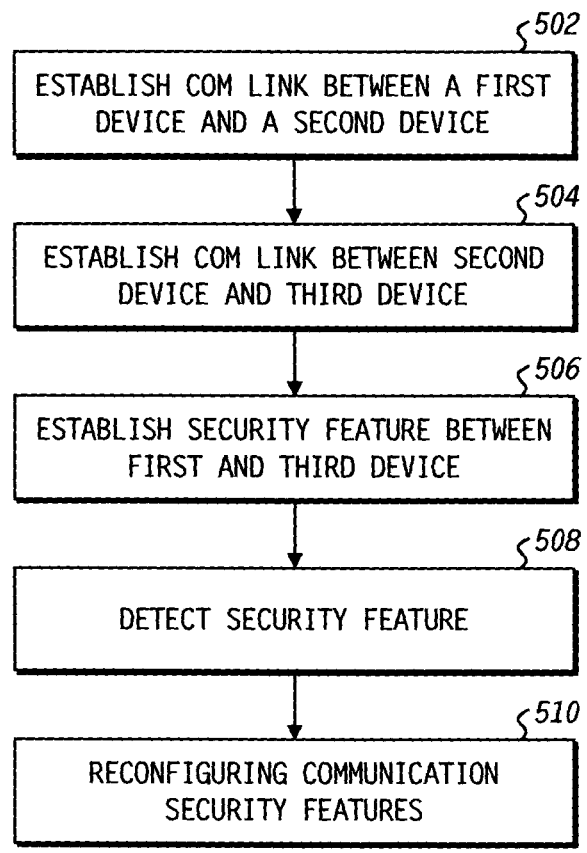
FIG. 5 is a flow diagram depicting a method of managing network security.

Referring now to FIG. 5 an exemplary flow diagram of a security feature management process is illustrated. At 502, a communication link between a first device and a second device is established. The communication link may employ or utilize a security feature. A second communication link between the second device and the third device can be established at 504. The second communication link may also implement a security feature. A third security feature such as a VPN or an SSL may then be established between the first and third device at 506. At 508 security features are detected and at 510 the security features can be managed. One form of security management would be to disable the first security features when the third security feature is in operation.

In one configuration a user can select a security level such as a minimal, average, and maximum-security level. The security engine(s) can maintain the selected level using a set of predetermined rules. If a maximum security level is selected then a sophisticated encryption and authentication algorithm may be selected and all sub-link security would remain in force. If an average security level was selected all battery powered devices may disable their local security features when a VPN is operational over system sub-links while non-power sensitive device (i.e., non-battery devices) maintain local security feature, and if a minimal security level was selected all security may be disabled except for the VPN.

Figure 6:
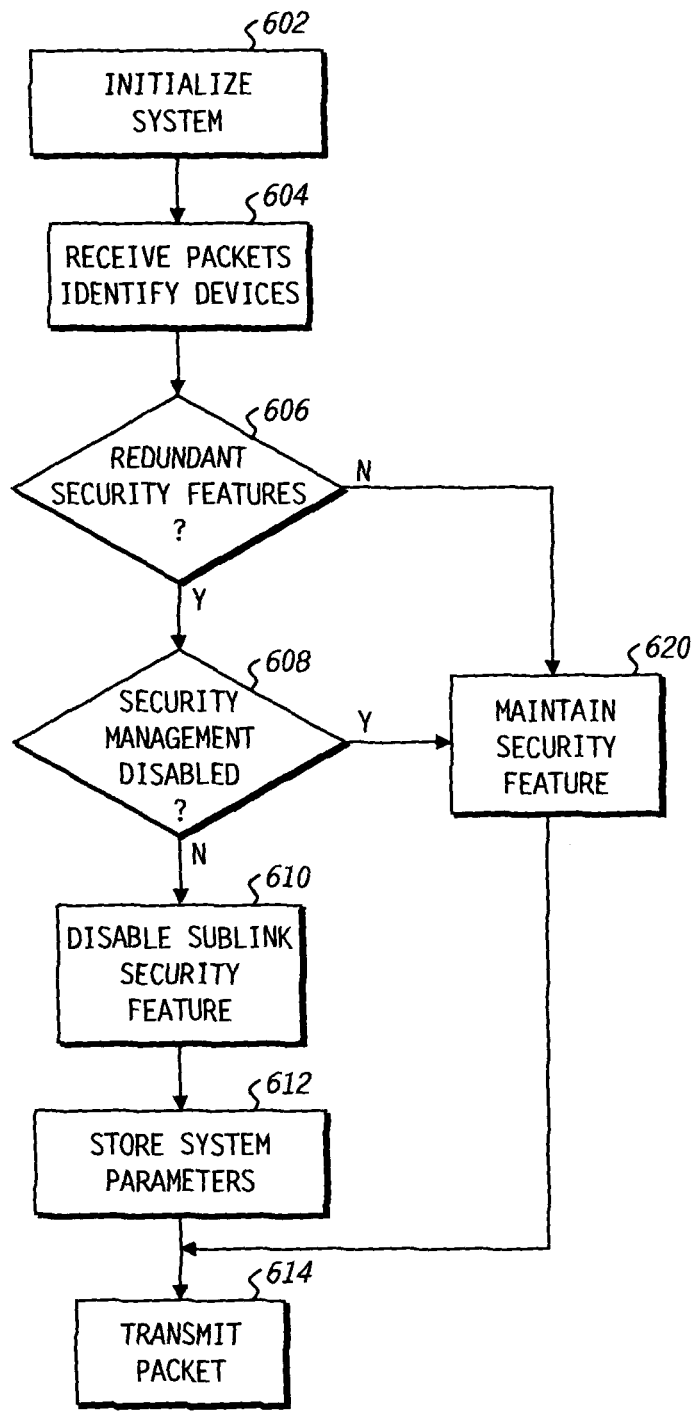
FIG. 6 is a flow diagram depicting another method of managing network security.

Referring to FIG. 6 a method of managing network security is illustrated. The system can be initialized at 602. In one configuration initialization includes clearing a memory location that stores identifiers of devices that are active on the network, communication links between the devices and security features operational over the communication links at 602. A transmission can be received at 604 possibly containing packets. Based on data contained in the packets, devices involved in the transmission can be identified.

It can be determined if the transmission has an redundant security feature at decision block 606 and if so then it can be determined if security management has been disabled at 608. If the security management has not been disabled, then a security feature on a communication sub-link can be disabled at 610. System parameters such as an identification of the device and security feature that has been affected by the security feature disablement can be stored at 612 and the packets can be transmitted over the network at 614.

Referring back to decision 606 if the transmission does not have a redundant security feature or the packets are not encrypted, then the security feature of the received packets are maintained at 620 for transmitting at 614. Referring back to decision block 608, if the security management is disabled the security features are maintained at 620 by the device and the packets are transmitted at 614.

Figure 7:
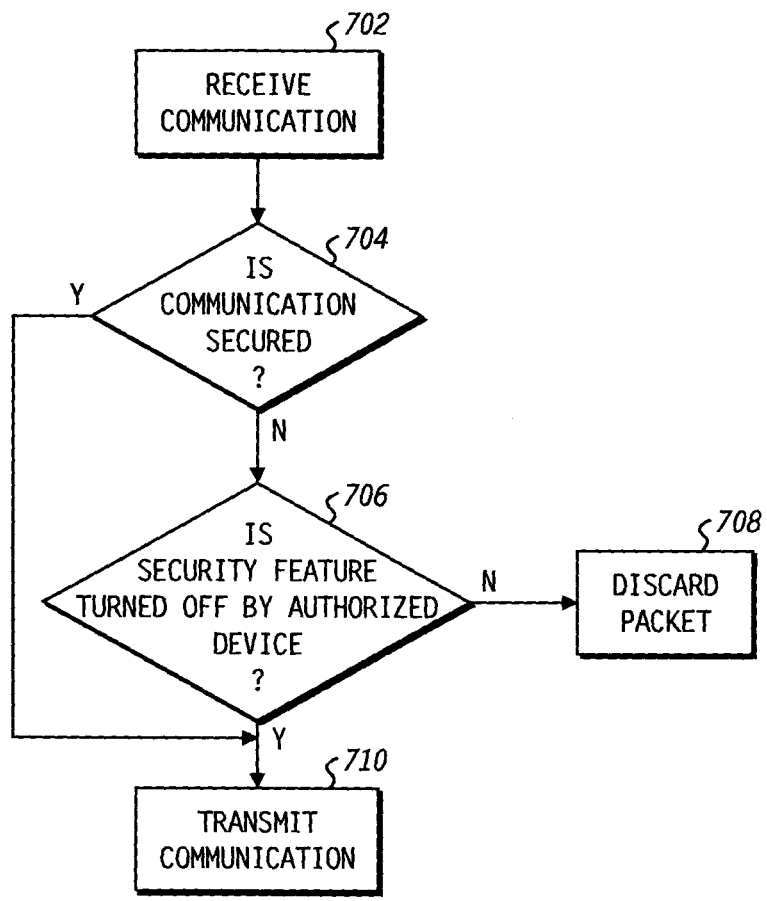
FIG. 7 is a flow diagram depicting yet another method of managing network security.

Referring to FIG. 7 a method of providing secure communication is disclosed. At 702 a communication is received, possibly in the form of a packet, and at 704 it is determined if the communication has an expected security feature. If the communication has the expected feature then the communication can be transmitted at 710. When it is determined that the communication does not contain the expected security feature at 704, it is determined if the communication has been received from a device that is authorized to transmit communications without the expected security features at 706. Validation of a device that is authorized to control security features can be achieved by accessing an authorization table. A controller of a local network (an intermediary device) such as an access point, a cellular telephone or an ad hoc network device, can store media access control (MAC) address, Internet protocol (IP) address, private IP address, user name and/or any other relevant identifiers or parameter for devices actively communicating. Thus, whenever a packet is received by the intermediary device, the intermediary device can determine if the packet is coming from one of the authorized devices listed in the local table. The intermediary device can also determine if the communication is not secured or is not utilizing an encryption algorithm specified.

If the communication is from an unauthorized device (a device not in the table) at 706 the transmission or the packet can be discarded at 708. If it is determined that the communication is from an authorized device at 706 the communication can be transmitted at 710.

In order to limit the transmission of unsecured packets, the processes can utilize a hardware or software filtering mechanism that scans valid packets for logical or physical address and based on the table, forward valid packets to the controller. The controller can add/remove entries to/from the hardware filter any time after authentication of a device. The controller can also detect encrypted packets when "over the air" security is enabled and present the user with a choice to lower or disable the over the air security. Thus, when the security has been turned off by an unauthorized device at 706 the transmission or packet is discarded at 708. If it is determined that an authorized device has turned off the security feature at 706 the communication can be transmitted at 710.

The method and apparatus herein provides for a flexible implementation. Although described using certain specific examples, it will be apparent to those skilled in the art that the examples are illustrative, and that many variations exist. For example, various types of communication devices, communication link types, and security features are currently available which could be suitable for use in employing the system and method as taught herein. Note also, that although an embodiment of the present disclosure has been shown and described in detail herein, along with certain variants thereof, many other varied embodiments that incorporate the teachings of the disclosure may be easily constructed by those skilled in the art.

Additionally, future communication devices, communication links and security features and systems could be implemented in accordance with the teachings herein. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure.

What is claimed is:

1. A communication device comprising:
a receiver configured to receive a first communication from a source, the first communication having a first end-to-end security feature;
a transmitter configured to provide a second communication for a destination, the second communication having the first end-to-end security feature; and
a communications security engine coupled to the receiver and to the transmitter and configured to determine the first end-to end security feature in communications of the source and the destination based on a communication from the source and targeted to the destination and to activate a second security feature associated with at least one of the first communication or the second communication in response to determining the first end-to-end security feature.

2. The device of claim 1, further comprising memory configured to store a user selected security profile wherein the second security feature is managed responsive to the determined first security measure and the selected security profile.

3. The device of claim 1, wherein the communications security engine is configured to detect communications utilizing a virtual private network configuration.

4. The device of claim 1, wherein the communication security engine will lower the level of security provided when multiple levels of security are detected.

5. The device of claim 1, wherein the communications security engine will increase the level of communication security when communication security below a designed level is detected.

6. The device of claim 1, wherein the second security feature is a ciphering operation.

7. A method of operation for a communication device comprising:
receiving at a communications intermediary a communication from a first communication device, the communication targeted to a second communication device, wherein the first communication device and the second communication device are endpoints of an end-to-end communication link;
detecting, based on the communication, a first end-to-end security feature associated with the end-to-end communication link, the first end-to-end security feature provided from the first communications device and provided for the second communication device; and
while maintaining the first end-to-end security feature, activating a second security feature in communications from the communications intermediary in response to detecting the first end-to-end security feature.

8. The method of claim 7, wherein the first end-to-end security feature is a virtual private network communication.

9. The method of claim 7, further comprising:
utilizing a user security preference to manage the second security feature.

10. The method of claim 7, further comprising:
maintaining at least a predetermined level of communication security.

11. The method of claim 7, further comprising a third communication device wherein the communications intermediary provides security in communications from the second communication device to the third communication device.

12. The method of claim 7, wherein the second network device is a wireless telephone.

13. The method of claim 7, wherein the second security feature is a ciphering operation.

14. The method of claim 7, wherein the second security feature is Wired Equivalent Privacy (WEP) or 802.11i based.

15. A method of providing secure communications comprising:
establishing an end-to-end communication link between a first network device and a second network device, wherein establishing the end-to-end communication link comprises:
establishing a communication link in communications between the first network device and a third network device;
establishing a communication link in communications between the second network device and the third network device;
enabling a first end-to-end security feature in communications from the first network device to the second network device;
determining a presence of the first security feature based on a first communication from the first network device and targeted to the second network device; and
while maintaining the first end-to-end security feature, activating a second security feature in communications from the third to the second network device in response to determining the presence of the first end-to-end security feature.

16. The method of claim 15, wherein the first security feature is provided by a virtual private network communication.

17. The method of claim 15, further comprising:
maintaining at least a predetermined level of communication security.

18. The method of claim 15, wherein the second network device is a wireless telephone.

19. The method of claim 15, wherein the second security feature is a ciphering operation.

20. The method of claim 15, wherein the second security feature is Wired Equivalent Privacy (WEP) or 802.11i based.

21. The method of claim 15 further comprising:
utilizing at least one user selectable security feature to modify the second communication security feature.

* * * * *